US011608930B2

(12) United States Patent
Huang et al.

(10) Patent No.: US 11,608,930 B2
(45) Date of Patent: Mar. 21, 2023

(54) SUPPORTING STAND

(71) Applicant: SYNCMOLD ENTERPRISE CORP., New Taipei (TW)

(72) Inventors: Chun-Hao Huang, New Taipei (TW); Ching-Hui Yen, New Taipei (TW); Chien-Wei Cheng, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/528,447

(22) Filed: Nov. 17, 2021

(65) Prior Publication Data

US 2022/0228701 A1 Jul. 21, 2022

Related U.S. Application Data

(60) Provisional application No. 63/138,981, filed on Jan. 19, 2021.

(30) Foreign Application Priority Data

Jul. 25, 2021 (TW) .................................. 110208737

(51) Int. Cl.
*F16M 11/24* (2006.01)
*F16M 11/00* (2006.01)
(Continued)

(52) U.S. Cl.
CPC ........... *F16M 11/041* (2013.01); *F16M 11/06* (2013.01); *F16M 11/10* (2013.01);
(Continued)

(58) Field of Classification Search
CPC ...... F16M 11/041; F16M 11/06; F16M 11/10; F16M 11/125; F16M 11/24;
(Continued)

(56) References Cited

U.S. PATENT DOCUMENTS 7,413,150 B1 * 8/2008 Hsu ........................ F16M 11/28
248/286.1
2004/0118984 A1 * 6/2004 Kim ..................... F16C 11/0619
248/917
(Continued)

FOREIGN PATENT DOCUMENTS

TW M383672 7/2010

*Primary Examiner* — Tan Le
(74) *Attorney, Agent, or Firm* — Muncy Geissler Olds & Lowe P.C.

(57) ABSTRACT

A supporting stand is provided. The supporting stand includes an upright, a slidable clipping unit, a slider, an elastic element, and a bearing board. The upright includes a column body. The slidable clipping unit clamps the column body, and includes a structural sleeve element and a contact element. The contact element has a first contact body and a second contact body being rollable relative to the column body. The elastic element is connected to the column body and the structural sleeve element. The slider is configured to the structural sleeve element. The bearing board is disposed on the slider and bears the display. When an external force is applied, the structural sleeve element makes the slider move between a highest position and a lowest position, and when the external force is removed, the slider stops at any position between the highest position and the lowest position.

15 Claims, 12 Drawing Sheets

(51) Int. Cl.
*F16M 11/04* (2006.01)
*F16M 11/10* (2006.01)
*F16M 11/12* (2006.01)
*F16M 11/06* (2006.01)
*F16M 11/22* (2006.01)

(52) U.S. Cl.
CPC ........... *F16M 11/125* (2013.01); *F16M 11/24* (2013.01); *F16M 11/22* (2013.01); *F16M 2200/022* (2013.01); *F16M 2200/024* (2013.01); *F16M 2200/027* (2013.01); *F16M 2200/041* (2013.01)

(58) Field of Classification Search
CPC ....... F16M 2200/022; F16M 2200/024; F16M 2200/027
See application file for complete search history.

(56) References Cited

U.S. PATENT DOCUMENTS

| | | | |
|---|---|---|---|
| 2009/0166302 A1* | 7/2009 | Hung | F16M 11/24 211/26.1 |
| 2010/0001147 A1* | 1/2010 | Wang | F16M 11/2021 345/87 |
| 2017/0152986 A1* | 6/2017 | Ho | F16M 11/2014 |
| 2020/0032953 A1* | 1/2020 | Chen | F16M 11/14 |
| 2022/0049814 A1* | 2/2022 | Lee | F16M 11/125 |

\* cited by examiner

SUPPORTING STAND

CROSS REFERENCE TO RELATED APPLICATION

This application claims the benefit of U.S. Provisional Application Ser. No. 63/138,981 filed on Jan. 19, 2021, and the benefit of Taiwan Patent Application Serial No. 110208737 filed on Jul. 25, 2021. The entirety of each application is incorporated herein by reference.

BACKGROUND OF THE INVENTION

1. Field of the Invention

The present invention relates to a supporting stand. Specifically, in the present invention, the supporting stand comprises the contact body being rollably disposed on the column body.

2. Description of Related Art

The Taiwan Patent No. M383672 discloses a supporting stand which includes a supporting body, a sliding element, an elastic element, and a bearing base, wherein the support body includes a rear wall, two side walls, two front walls and a slide rail assembly (i.e., two slide rails). The rear wall, the side walls, and the front walls jointly define an accommodating space, the slide rails are respectively disposed on the inner side of the side walls, and the sliding element is disposed on the sliding rails, the bearing base is disposed on the sliding element, and the elastic element is disposed on the bearing base.

The above-mentioned sliding rails are respectively screwed to the corresponding side walls by screws, the sliding element is also screwed to the sliding rails by screws, and the elastic element is set on the bearing base and hooked to the rear wall. For the convenience of assembly, there must be a certain distance between the side walls, that is, the width of the rear wall must be enough to allow the accommodating space to be large enough. However, in this way, the volume of the entire supporting stand cannot be effectively reduced, which does not follow the trend of lightness and slimness in recent years. Besides, even the accommodating space is large enough, the above assembling process is still not easy and fast.

SUMMARY OF THE INVENTION

An objective of the present invention is to provide a supporting stand which replaces the conventional complicated rear wall, two side walls and two front walls by a column body, uses a slidable clipping unit to surround and clamp the column body, and achieve rolling through the structural sleeve element and the contact element of the slidable clipping unit. Therefore, during assembly, the slidable clipping unit is directly sleeved on the column body, which is simple and convenient, and can also effectively reduce the volume to comply with recent trends.

To achieve the aforesaid objective, the present invention discloses a supporting stand for supporting a display on a working plane. The supporting stand includes an upright, a slidable clipping unit, a slider, an elastic element, and bearing board. The upright extends by following a gravity direction and includes a column body, the column body has a plate with a thickness. The slidable clipping unit abuts against the column body, and includes a structural sleeve element and a contact element. The structural sleeve element is sleeved on the column body. The contact element is disposed between the structural sleeve element and the column body. The contact element has a first contact body and a second contact body. The first contact body and the second contact body are rollable relative to the column body, the plate is arranged between the first contact body and the second contact body, and the plate is spaced apart from the first contact body in a first distance and being spaced apart from the second contact body in a second distance. The slider is configured to the structural sleeve element. The elastic element is connected to the column body and the structural sleeve element respectively, and permanently provides an elastic force. The bearing board is disposed on the slider and bears the display. A distance between the first contact body and the second contact body is substantially equal to a sum of the thickness, the first distance and the second distance. When an external force is applied, the structural sleeve element makes the slider move between a highest position and a lowest position. When the external force is removed, the slider stops at any position between the highest position and the lowest position.

The column body has a first side and a second side opposite to each other. The first contact body abuts against the first side, and the second contact body abuts against the second side.

The structural sleeve element has a first main board and a second main board, the first contact body is disposed on the first main board, the second contact body is disposed on the second main board, and the first contact body and the second contact body are located between the first main board and the second main board.

In one embodiment, the column body further has a first sliding groove and a second sliding groove, the first sliding groove is formed on the first side, the second sliding groove is formed on the second side, the first contact body is accommodated in the first sliding groove, and the second contact body is accommodated in the second sliding groove.

The first side and the second side respectively have a first surface, a second surface, and a third surface. The first surface, the second surface, and the third surface of the first side are angularly connected to each other to define the first sliding groove, and the first contact body abuts against the first surface and the third surface of the first side. The first surface, the second surface, and the third surface of the second side are angularly connected to each other to define the second sliding groove, and the second contact body abuts against the first surface and the third surface of the second side.

In one embodiment, the first side further has a plurality of first protrusions, and the first protrusions are respectively formed on the first surface and the third surface of the first side for guiding the first contact body. The second side further has a plurality of second protrusions, and the second protrusions are respectively formed on the first surface and the third surface of the second side for guiding the second contact body.

In one embodiment, the slider extends from the structural sleeve element along a first axis perpendicular to the gravity direction, the first main board has a first extending section for disposing the first contact body, the second main board has a second extending section for disposing the second contact body, and the first extending section and the second extending section are parallel to the first axis and spaced apart from each other.

The first main board further has a first bending section angularly connected to the first extending section, the second main board further has a second bending section angularly connected to the second extending section, and the first bending section and the second bending section are perpendicular to the first axis and secured to each other.

In one embodiment, the elastic element has an elastic body and a base body, the base body is fixedly connected to the first extending section and the second extending section, and the elastic body is disposed in the base body and connected to an end of the column body.

In one embodiment, the first contact body is a wheel roller set, a ball roller set, a rolling column set, or a bearing set, and the second contact body is a wheel roller set, a ball roller set, a rolling column set, or a bearing set.

A plurality of wheel rollers in the wheel roller set are arranged with misalignment, a plurality of ball rollers in the ball roller set are arranged with misalignment, a plurality of rolling columns in the rolling column set are arranged with misalignment, and a plurality of bearings in the bearing set are arranged with misalignment.

In one embodiment, the structural sleeve element and the contact element surround the column body jointly.

In one embodiment, the contact element further has a third contact body and a fourth contact body, the column body further has a third side and a fourth side, the third contact body abuts against the third side, and the fourth contact body abuts against the fourth side.

The third contact body and the fourth contact body are polyoxymethylene protruding blocks.

In one embodiment, the upright further includes a housing for covering the column body and the slidable clipping unit.

In one embodiment, the supporting stand further includes a chassis which is arranged on the working plane, and the upright further includes a transfer base that is detachably installed on the chassis for disposing the column body.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
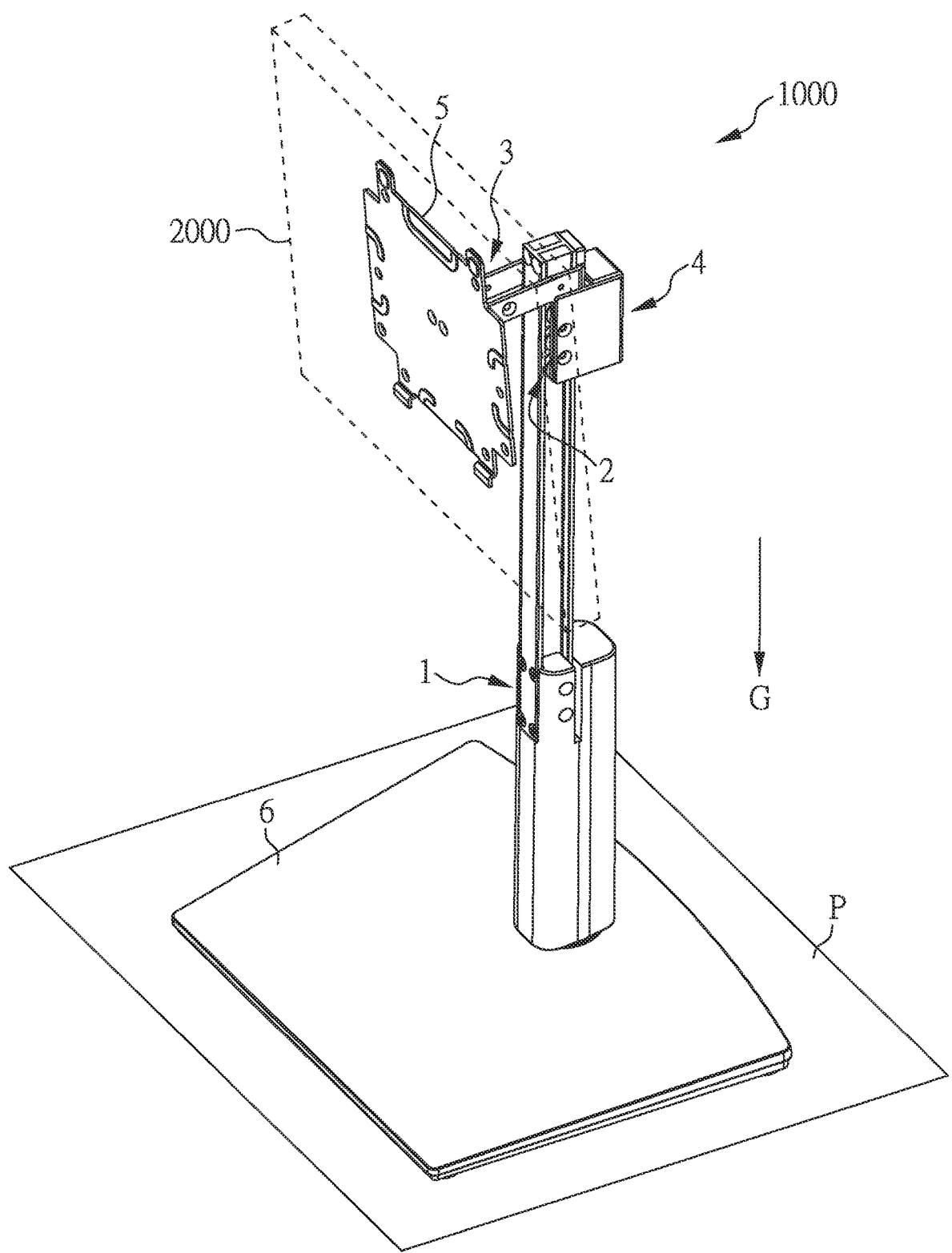
FIG. 1 is a schematic view of the supporting stand according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
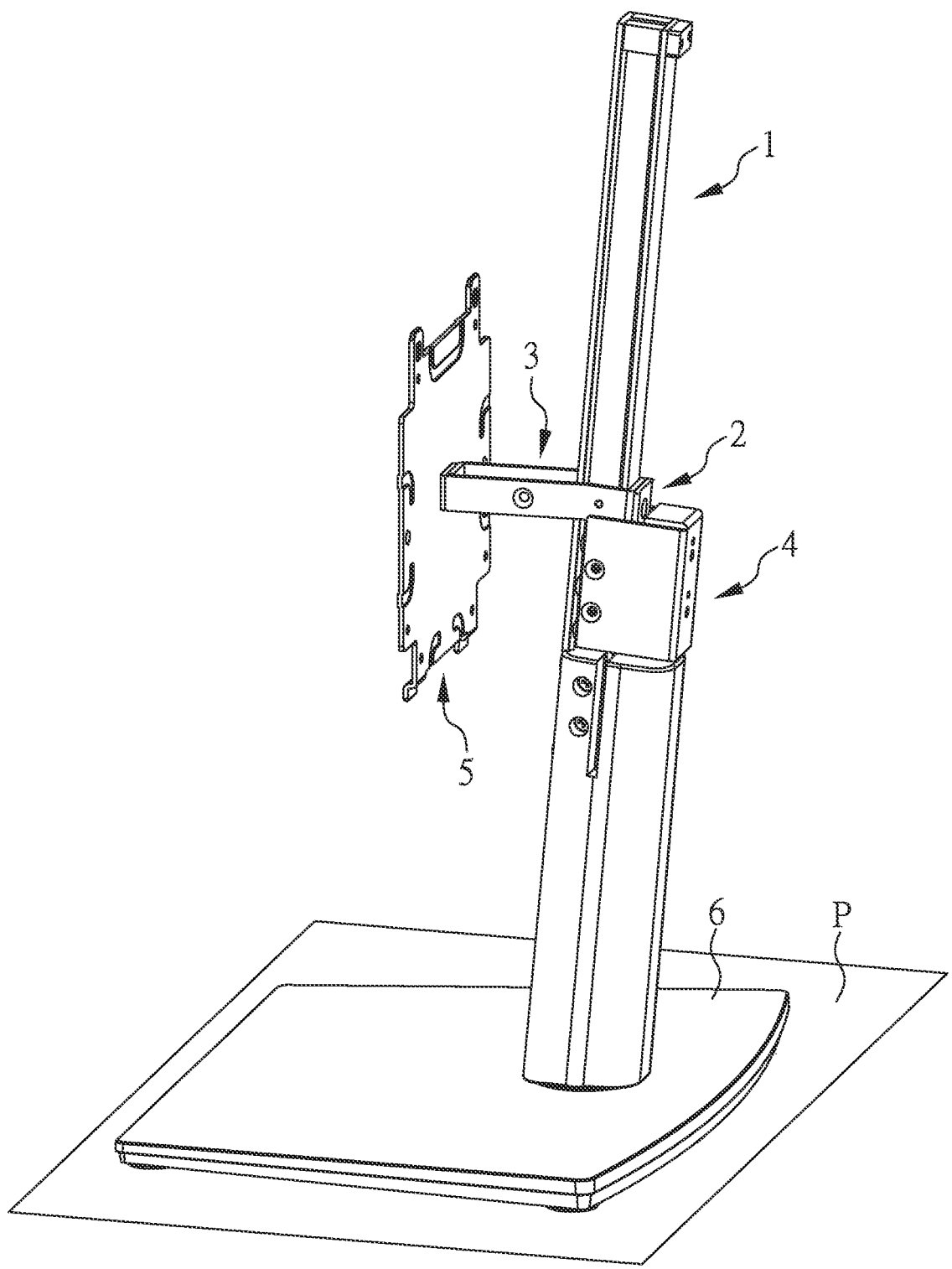
FIG. 2 is another schematic view of the supporting stand according to the present invention.

Reference is made to FIG. 1 to FIG. 2. FIG. 1 is a schematic view of the supporting stand 1000 of the present invention. FIG. 2 is another schematic view of the supporting stand 1000 according to the present invention. The supporting stand 1000 is used for supporting a display 2000 on a working plane P. The supporting stand 1000 includes an upright 1, a slidable clipping unit 2, a slider 3, an elastic element 4, a bearing board 5, and a chassis 6. The upright 1 roughly extends by following a gravity direction G. In this embodiment, the working plane P is a desktop, and the upright 1 extends in a manner of slightly inclined toward the working plane P. In other embodiments, the upright 1 may extend vertical to the working plane P, but not limited thereto. The slidable clipping unit 2 abuts against the upright 1, the slider 3 is fixed to the slidable clipping unit 2, the elastic element 4 is connected to the upright 1 and the slidable clipping unit 2 respectively, and the bearing board 5 is disposed on the slider 3 and bears the display 2000. The chassis 6 is disposed on the working plane P and is used for disposing the upright 1.

Figure 3:
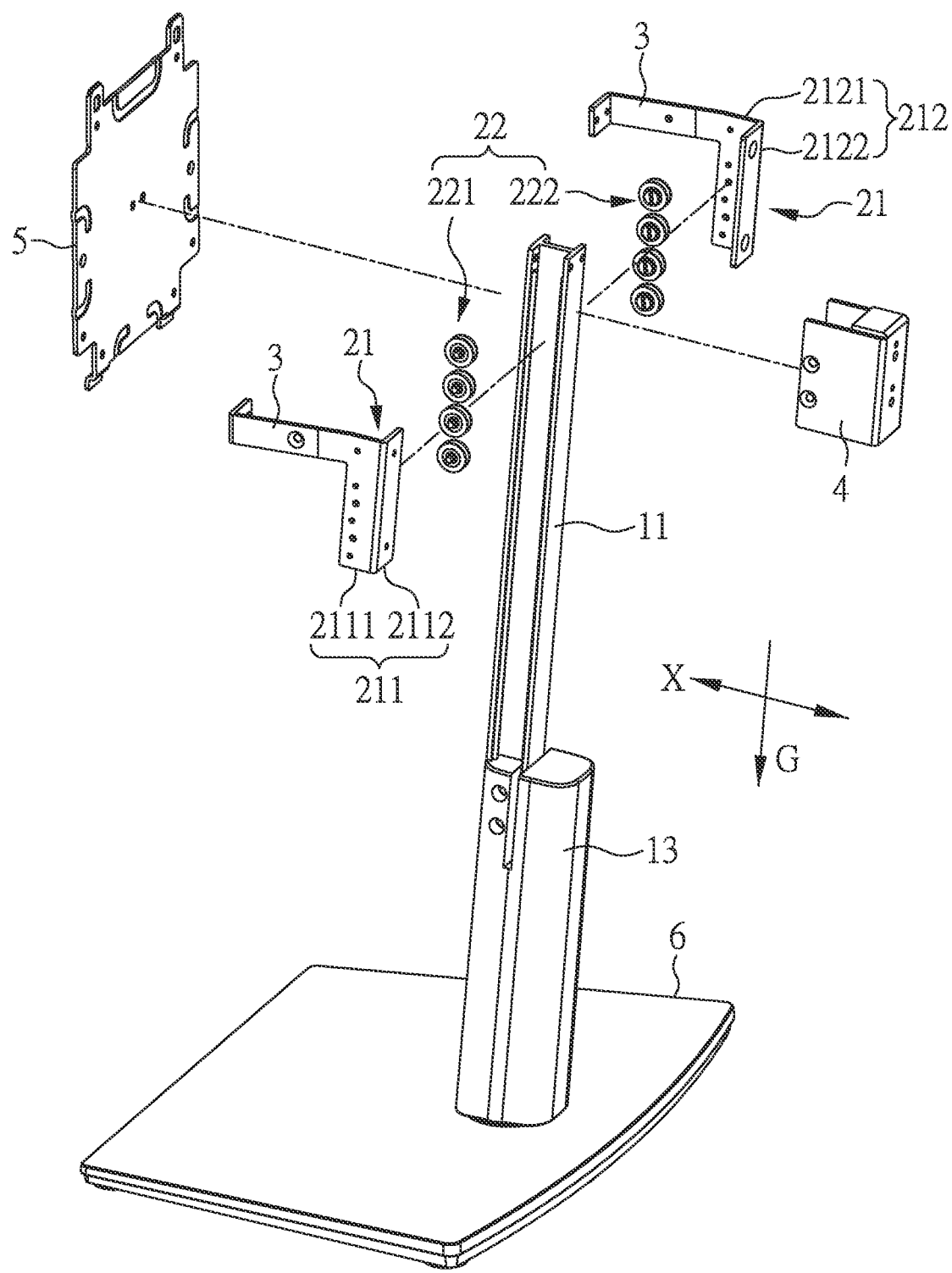
FIG. 3 is an exploded view of the supporting stand according to the present invention.
Figure 4:
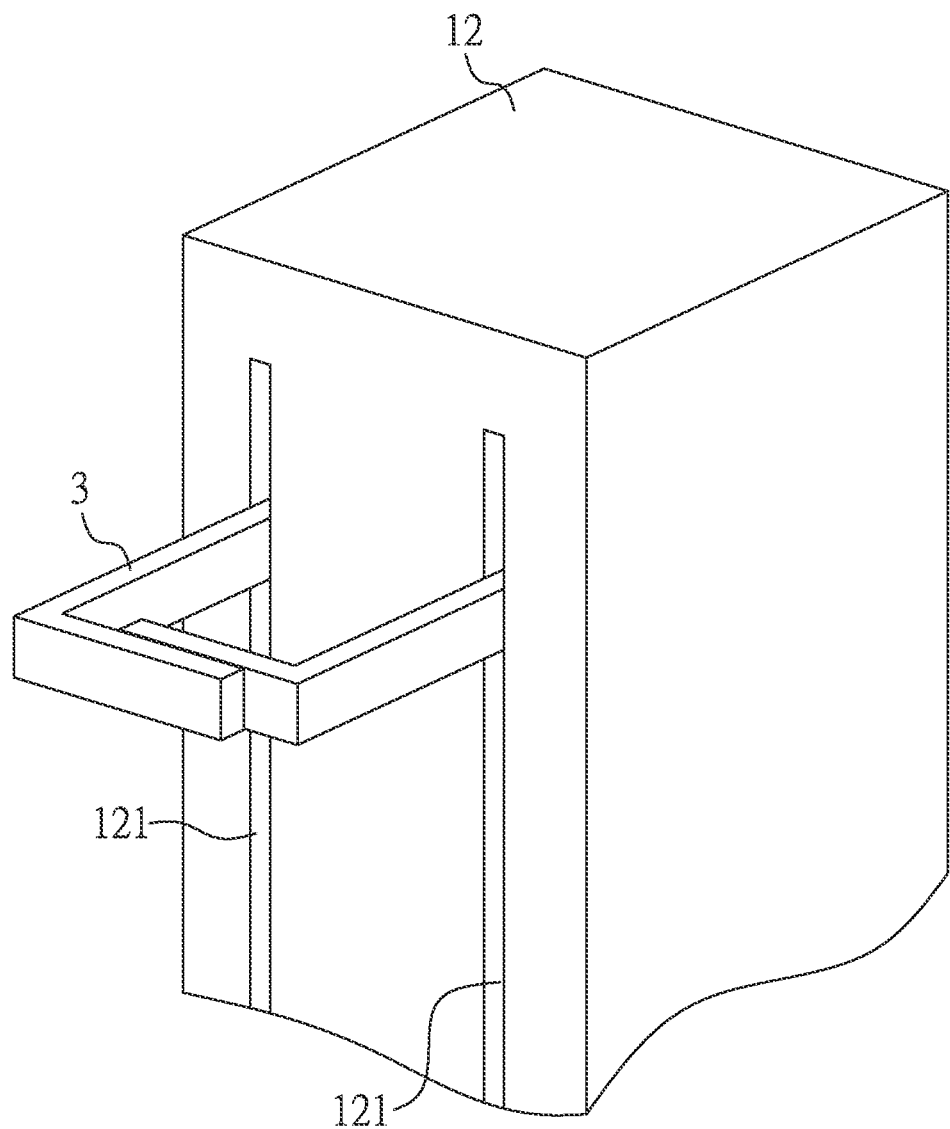
FIG. 4 is a schematic view of the housing that covers the column body and the slidable clipping unit according to the present invention.
Figure 5:
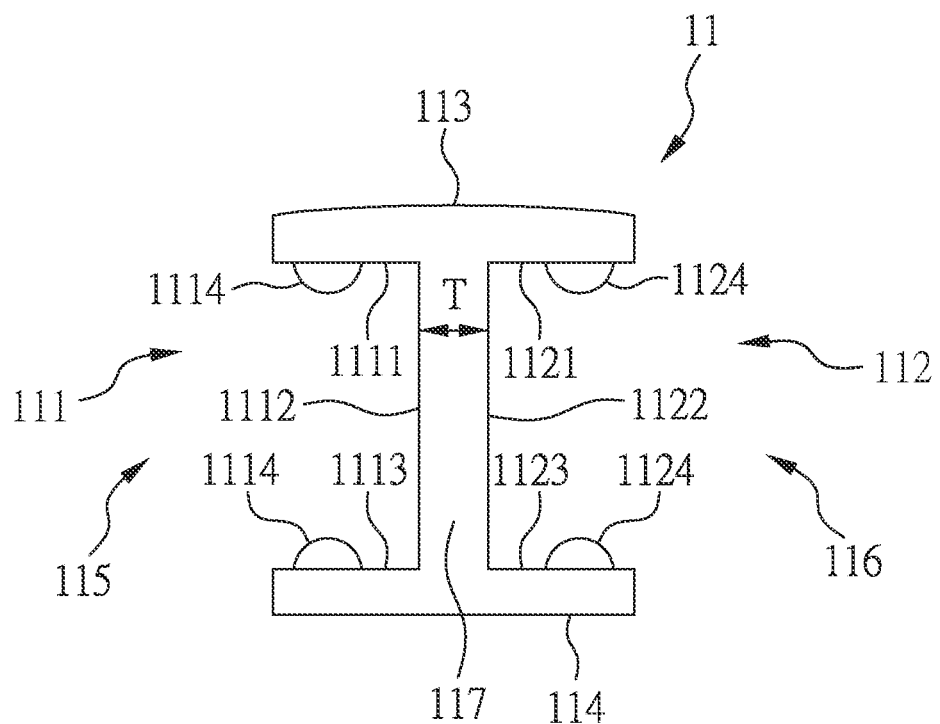
FIG. 5 is a top view of the H-shaped column body with protrusions.

Reference is made to FIG. 3 to FIG. 5. FIG. 3 is an exploded view of the supporting stand 1000 of the present invention. FIG. 4 is a schematic view of the housing that covers the column body 11 and the slidable clipping unit 2 according to the present invention. FIG. 5 is a top view of the H-shaped column body with protrusions. The upright 1 includes a column body 11, a housing 12, and a transfer base 13. Since the column body 11 is the main supporting structure, it must have considerable structural strength, for example, a die-casting metal column. In this embodiment, the column body 11 is H-shaped as shown in FIG. 5, and the column body 11 has a first side 111, a second side 112, a first sliding groove 115, a second sliding groove 116, and a plate 117. The second side 112 is opposite to the first side 111. The first sliding groove 115 is formed on the first side 111, and the second sliding groove 116 is formed on the second side 112, that is, the first sliding groove 115 and the second sliding groove 116 are respectively formed on both sides of the plate 117. The plate 117 has a thickness T. The housing 12 covers the column body 11 and the slidable clipping unit 2, and has two openings 121 substantially extending parallel to the gravity direction G, as shown in FIG. 4. The slider 3 is fixed to the slidable clipping unit 2 through the opening 121, and slides parallel to the gravity direction G. The transfer base 13 is disposed on the chassis 6. For example, the bottom of the transfer base 13 has a groove, and the chassis 6 has a protrusion. The shape of the protrusion and the shape of the groove correspond to and match with each other. Therefore, the bottom of the transfer base 13 is detachably (e.g., through screws) installed on the chassis 6. In addition, the top of the transfer base 13 also has a groove corresponding to the shape of the column body 11 for disposing the column body 11.

To be more specific, the first side 111 has a first surface 1111, a second surface 1112, a third surface 1113, and two first protrusions 1114. The first surface 1111, the second surface 1112, and the third surface 1113 of the first side 111 are angularly connected to each other to define the first sliding groove 115. The first protrusions 1114 are formed on the first surface 1111 and the third surface 1113 of the first side 111. The second side 112 has a first surface 1121, a second surface 1122, a third surface 1123, and two second protrusions 1124. The first surface 1121, the second surface 1122, and the third surface 1123 of the second side 112 are angularly connected to each other to define the second sliding groove 116. The second protrusions 1124 are formed on the first surface 1121 and the third surface 1123 of the first side 111. The second surface 1112 of the first side 111 and the second surface 1122 of the second side 112 are two main surfaces (i.e., the front side and the back side) of the plate 117.

It should be noted that the H-shaped column body 11 of this embodiment can be processed by a rectangular solid column body, for example: the rectangular solid column body is turned to have two sliding grooves by computer numerical control (CNC) machining. In addition, it can also be directly casted through a mold or formed by welding two or three metal plates.

The slidable clipping unit 2 clamps the column body 11, and includes a structural sleeve element 21 and a contact element 22. The structural sleeve element 21 is sleeved on the column body 11, and the contact element 22 is disposed between the structural sleeve element 21 and the column body 11. Specifically, reference is made to FIG. 3. The structural sleeve element 21 has a first main board 211 and a second main board 212, the contact element 22 is located between the first main board 211 and the second main board 212, and has a first contact body 221 and a second contact body 222. The first contact body 221 is disposed on the first main board 211, the second contact body 222 is disposed on the second main board 212, and the first contact body 221 and the second contact body 222 can roll relative to the column body 11.

In detail, please refer to FIG. 3 again. The first main board 211 has a first extending section 2111 and a first bending section 2112, and the second main board 212 has a second extending section 2121 and a second bending section 2122. The first extending section 2111 is provided with at least one hole (not labeled in the figure) for at least one fixing element (not labeled in the figure) to fix the first contact body 221 on the first extending section 2111, and the second extending section 2121 is also provided with at least one hole (not labeled in the figure) for at least one fixing element (not labeled in the figure) to fix the second contact body 222 on the second extending section 2121.

The first bending section 2112 is angularly connected to the first extending section 2111, and the second bending section 2122 is angularly connected to the second extending section 2121. The first extending section 2111 and the second extending section 2121 are spaced apart from each other, and the first bending section 2112 and the second bending section 2122 are fixed to each other. Under the circumstance of the first extending section 2111 and the second extending section 2121 are both parallel to a first axis X perpendicular to the gravity direction G, the first bending section 2112 and the second bending section 2122 are approximately perpendicular to the first axis X, the first bending section 2112 and the first extending section 2111 are approximately perpendicular to each other, and the second bending section 2122 and the second extending section 2121 are approximately perpendicular to each other.

It shall be noted that the first bending section 2112 being angularly connected to the first extending section 2111, and the second bending section 2122 being angularly connected to the second extending section 2121 are only for illustration instead of limiting the present invention.

The first contact body 221 abuts against the first side 111 of the column body 11 and is accommodated in the first sliding groove 115, and the second contact body 222 abuts against the second side 112 of the column body 11 and is accommodated in the second sliding groove 116. In this way, the plate 117 is disposed between the first contact body 221 and the second contact body 222, and is spaced apart from the first contact body 221 in a first distance D1 (not zero), and is spaced apart from the second contact body 222 in a second distance D2 (not zero). A distance D between the first contact body 221 and the second contact body 222 is substantially equal to the sum of the thickness T, the first distance D1 and the second distance D2, as shown in FIG. 6.

To be more specific, the first contact body 221 simultaneously abuts against the first protrusions 1114 formed on the first surface 1111 and the third surface 1113 of the first side 111, and the first protrusions 1114 guides the first contact body 221 to roll up and down. The second contact body 222 abuts against the second protrusions 1124 formed on the first surface 1121 and the third surface 1123 of the second side 112, and the second protrusions 1124 guides the second contact body 222 to roll up and down. Therefore, the first contact body 221 and the second contact body 222 are stably limited in the first sliding groove 115 and the second sliding groove 116 respectively without swaying. In addition, if the size of the first protrusions 1114 and the second protrusions 1124 is smaller, the first contact body 221 and the second contact body 222 may also roll stably since the first contact body 221 abuts against the first surface 1111 and the third surface 1113 of the first side 111, and the second contact body 222 abuts against the first surface 1121 and the third surface 1123 of the second side 112.

Figure 6:
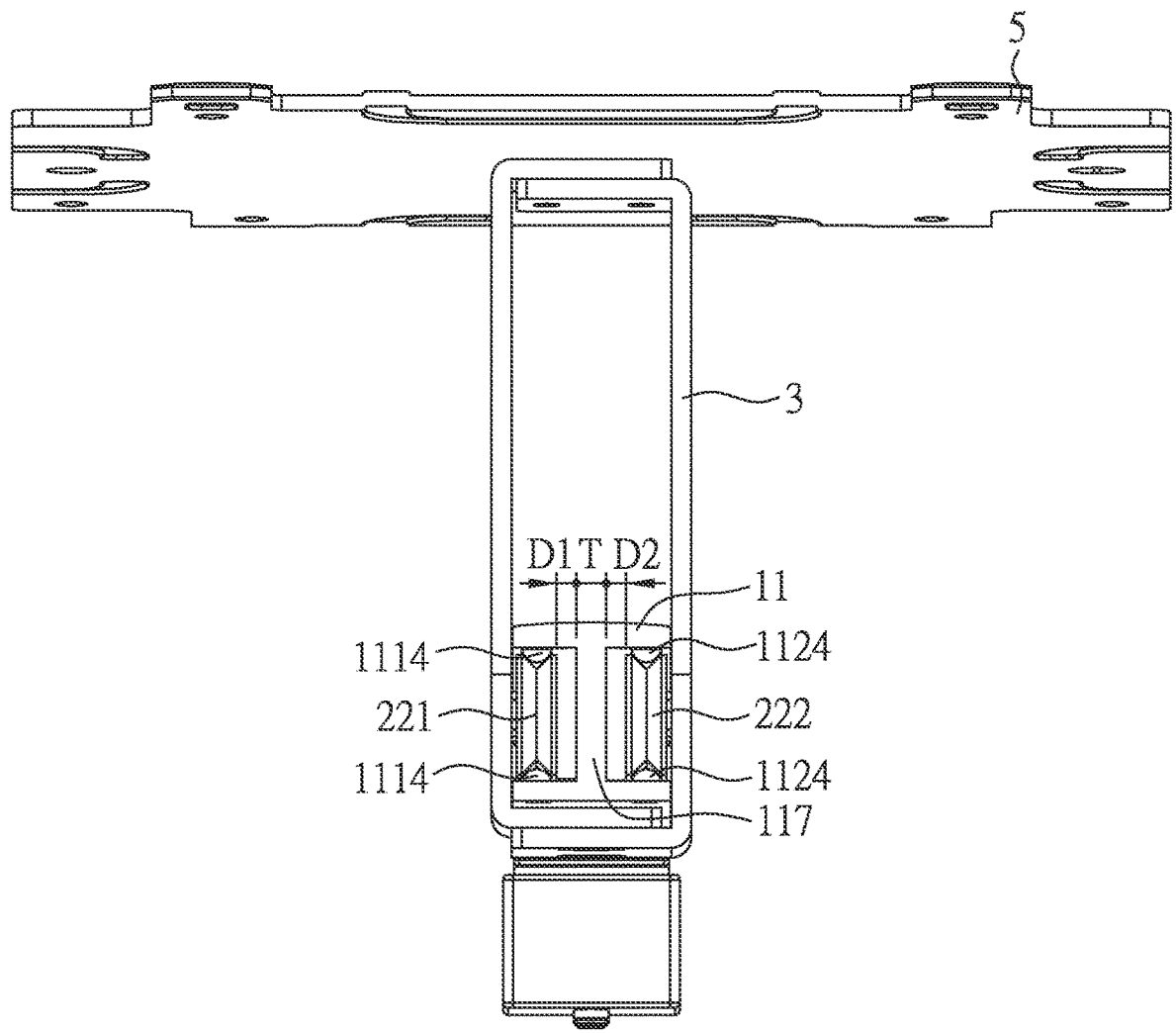
FIG. 6 is a top view of the supporting stand according to the present invention.
Figure 7:
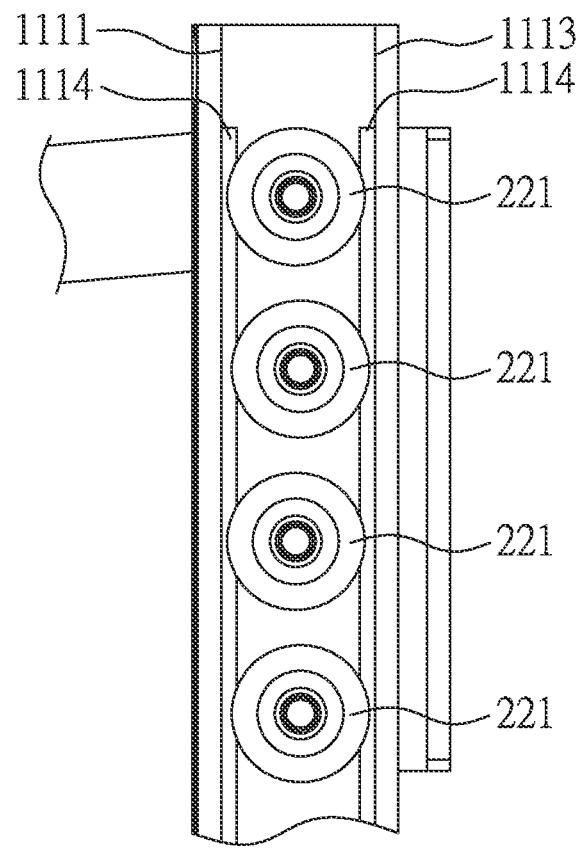
FIG. 7 is a side view of the supporting stand according to the present invention.

In this embodiment, reference is made to FIG. 5, FIG. 6 and FIG. 7. The first contact body 221 is a bearing set located in the first sliding groove 115 abutting against the first protrusions 1114, and the second contact body 222 is a bearing set located in the second sliding groove 116 abutting against the second protrusions 1124. In addition, the bearing set of this embodiment is composed of four bearings, preferably the bearings are arranged with misalignment. Taking the bearings from top to bottom shown in FIG. 7, the first bearing and the third bearing are closer to the first surface 1111 and abut against the first protrusions 1114, thus the first bearing and the third bearing mainly roll on the first protrusion 1114 formed on the first surface 1111, while the second bearing and the fourth bearing are closer to the third surface 1113 and abut against the first protrusion 1114, thus the second bearing and the fourth bearing mainly roll on the first protrusion 1114 formed on the third surface 1113.

It shall be noted that the foregoing side view only take the first contact body 221 as an example, and the second contact body 222 can be arranged in the same way as the first contact body 221.

The slider 3 is disposed on structural sleeve element 21, and extends from the first extending section 2111 and the second extending section 2121 of the structural sleeve element 21 along the first axis X, and moves between a highest position (as shown in FIG. 1) and a lowest position (as shown in FIG. 2) along the gravity direction G. In this embodiment, the slider 3 and the structural sleeve element 21 are formed integrally, but not limited to thereto. Besides, the slider 3 and the bearing board 5 are directly fixed, but the slider 3 may also include a hinge (not shown in the figure) so that the bearing board 5 can adjust an inclination angle relative to the slider 3.

The elastic element 4 is connected to the column body 11 and the structural sleeve element 21 respectively, and permanently provides an elastic force. Specifically, reference being made to FIG. 8, the elastic element 4 has an elastic body 41 and a base body 42, and the elastic body 41 is disposed in the base body 42 and connected to an end of the column body 11. The elastic body 41 has a winding section 411 and a fixing section 412. In this embodiment, the fixing section 412 is a fixed end which is secured to the column body 11. The winding section 411 is configured to the base body 42. The base body 42 has at least one connecting hole (not labeled in the figure) on both sides for fixing with the first extending section 2111 and the second extending section 2121 of the structural sleeve element 21 to move up and down with the structural sleeve element 21 while the winding section 411 also moves up and down to continuously provide the elastic force to the structural sleeve element 21.

Figure 8:
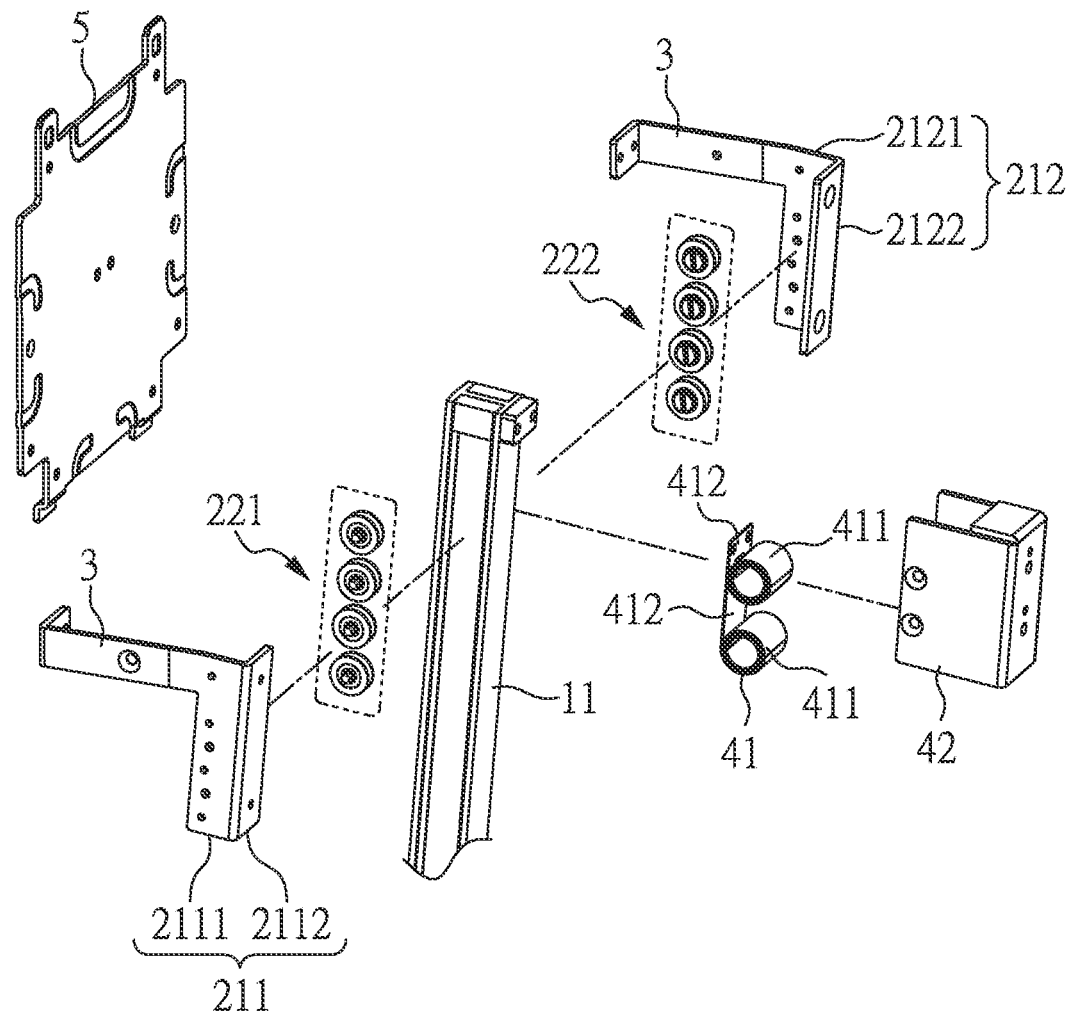
FIG. 8 is a partial exploded view of the supporting stand according to the present invention.

The elastic body 41 may be a constant force spring, but not limited thereto. It shall be noted that the number and specification of the winding section 411 and the fixing section 412 are determined based on the weight of the preset display 2000. The two sets of winding sections 411 and the fixing section 412 shown in FIG. 8 are only for illustration, but not limit the present invention. Thus, when an external force is applied, the structural sleeve element 21 makes the slider 3 move between the highest position and the lowest position along the gravity direction G, and when the external force is removed, the slider 3 stops at any position between the highest position and the lowest position.

Figure 9:
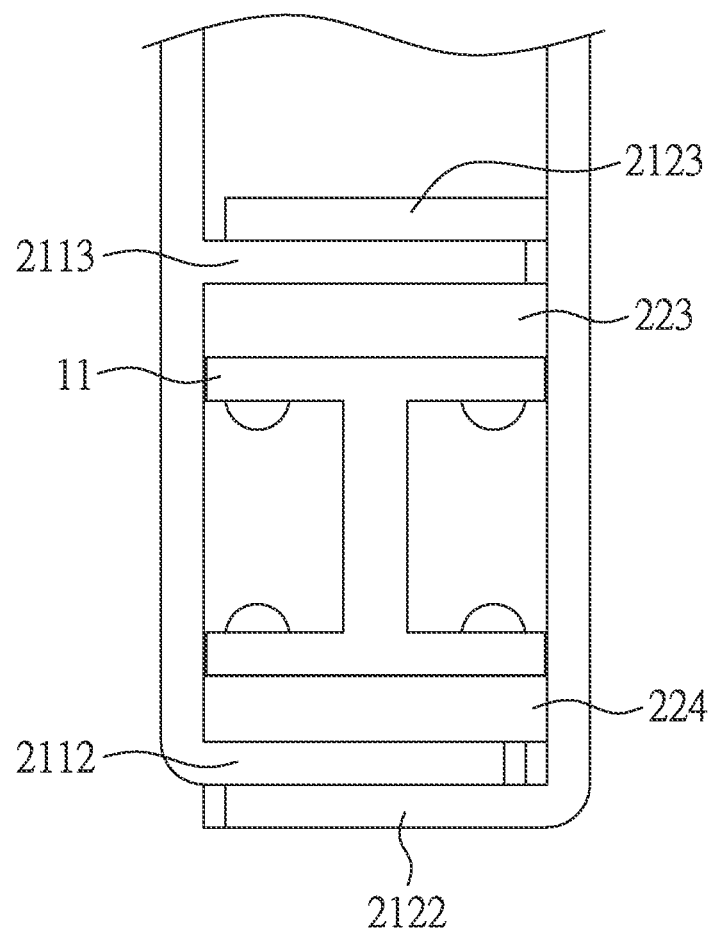
FIG. 9 is a top view of the column body, the slidable clipping unit, and the slider according to the present invention.

In one embodiment, the structural sleeve element 21 and the contact element 22 surround the column body 11 jointly. Specifically, reference being made to FIG. 5 and FIG. 9, the contact element 22 further has a third contact body 223 and a fourth contact body 224, and the column body 11 further has a third side 113 and a fourth side 114. The third contact body 223 and the fourth contact body 224 are polyoxymethylene protruding blocks respectively, the third contact body 223 abuts against the third side 113, and the fourth contact body 224 abuts against the fourth side 114 so that the slider 3 would not sway seriously while moving.

Furthermore, the first main board 211 further has a first abutting section 2113, and the second main board 212 further has a second abutting section 2123. The first abutting section 2113 and the second abutting section 2123 fix the third contact body 223, and the first abutting section 2113 and the second abutting section 2123 are fixed to each other. Similarly, the first bending section 2112 and the second extending section 2122 fix the fourth contact body 224, and the first bending section 2112 and the second bending section 2122 are fixed to each other.

Figure 10:
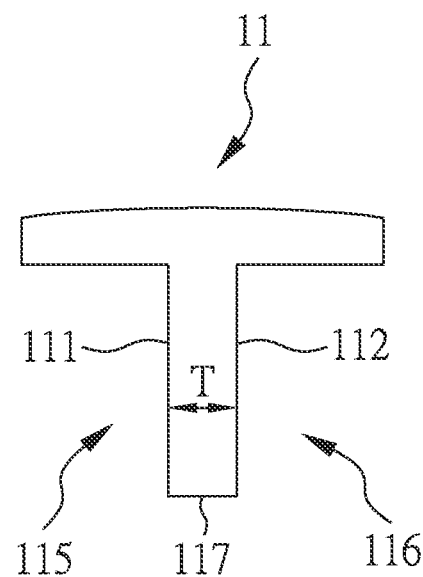
FIG. 10 is a top view of the T-shaped column body according to the present invention.
Figure 11:
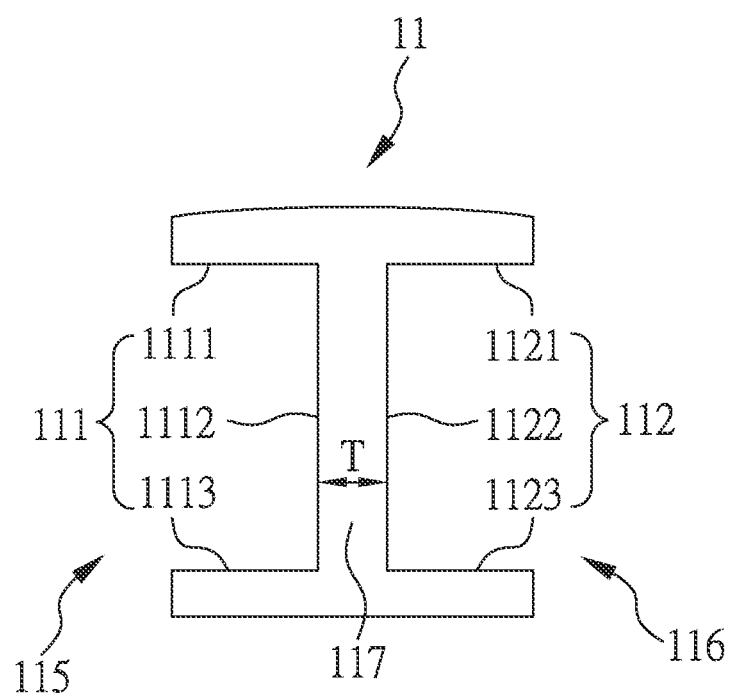
FIG. 11 is a top view of the H-shaped column body according to the present invention.

In other embodiments, the column body 11 may be implemented as the column body 11 with T-shaped cross-section as shown in FIG. 10, or as the column body 11 with H-shaped cross-section as shown in FIG. 11, but omitted the first protrusions 1114 and the second protrusions 1124.

Figures 12, 13:
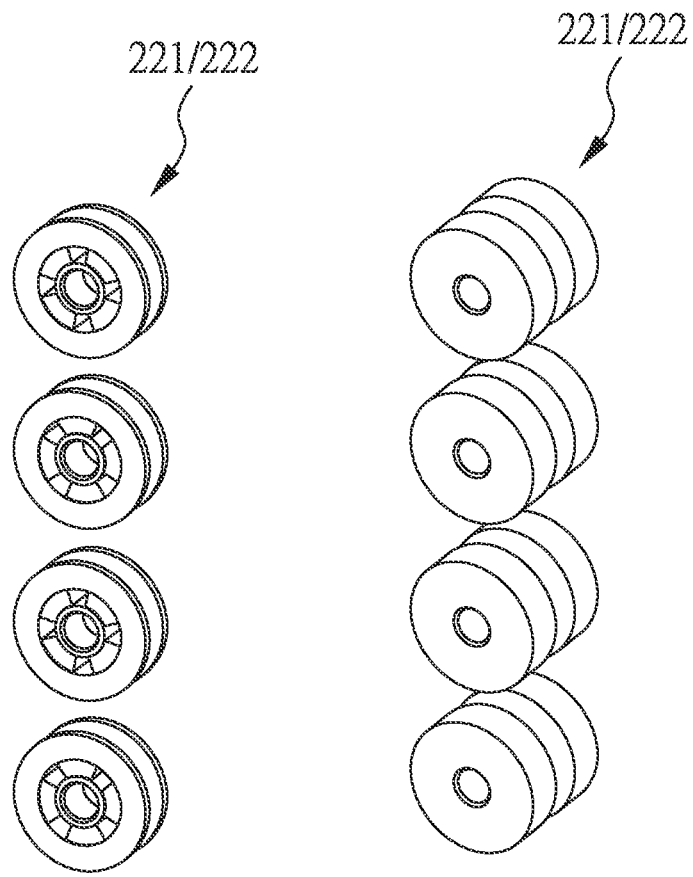
FIG. 12 is a schematic view of the first contact body which is a wheel roller set according to the present invention.
FIG. 13 is a schematic view of the first contact body which is a rolling column set according to the present invention.

In other embodiments, the first contact body 221 and the second contact body 222 shown in the dotted frame in FIG. 8 can be replaced with a wheel roller set (as shown in FIG. 12) or a rolling column set (as shown in FIG. 13), but not limited thereto.

Figure 14:
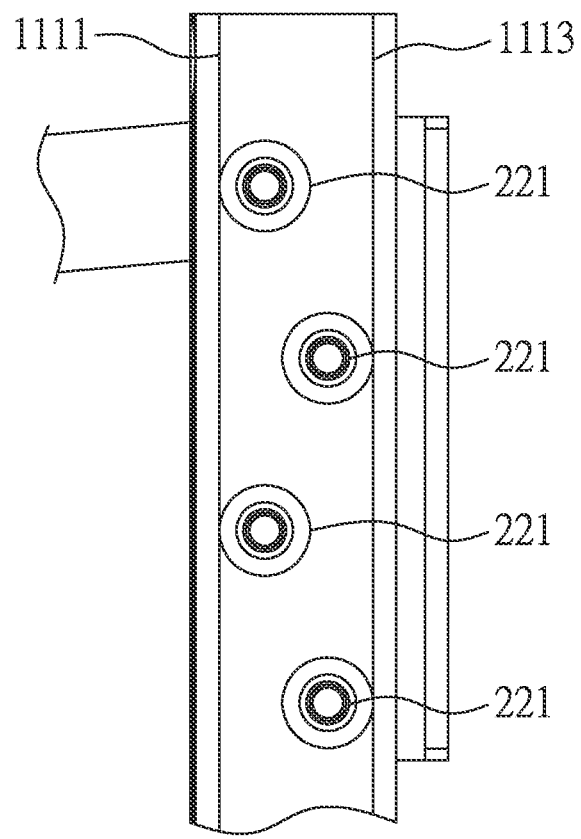
FIG. 14 is a side view of the supporting stand according to the present invention.

In one embodiment, please refer to FIG. 14. The column body 11 has H-shaped cross-section and omits first protrusions 1114. The first contact body 221 is the ball roller set, wherein two of the ball rollers abut against the first surface 1111 of the first side 111, and the other two of the ball rollers abut against the third surface 1113 of the first side 111. It shall be noted that the side view as shown in FIG. 14 only take the first contact body 221 as an example, and the second contact body 222 can be arranged in the same way as the first contact body 2221.

It shall be noted here that the number of the bearings in the bearing set, the number of the wheel rollers in the wheel roller set, the number of the rolling columns in the rolling column set, and the number of the ball rollers in the ball roller set in the above-mentioned embodiment are all four as an example (as shown in FIG. 8, FIG. 12, FIG. 13, and FIG. 14), and in other embodiments, the number is not limited to four, as long as the number is an even number.

According to the above, the supporting stand of the present invention uses the column body with a specific shape to cooperate with a corresponding slidable clipping unit clipping the column body by being sleeved thereon, and by using the structural sleeve element, the contact element of the slidable clipping unit, and the elastic body of the elastic element, the slidable clipping unit can be moved by rolling, which not only facilitates the assembling processes, but also effectively reduces the volume.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A supporting stand for supporting a display on a working plane, the supporting stand comprising:
   an upright extending by following a gravity direction and comprising a column body, the column body having a first side, a second side, a first sliding groove, a second sliding groove and a plate, the first side and the second side respectively having a first surface, a second surface, and a third surface, the first side further having a plurality of first protrusions respectively formed on the first surface and the third surface of the first side for guiding a first contact body, and the second side further having a plurality of second protrusions respectively formed on the first surface and the third surface of the second side for guiding a second contact body, and the plate having a thickness;
   a slidable clipping unit abutting against the column body, and comprising a structural sleeve element and a contact element, the structural sleeve element being sleeved on the column body, the contact element being disposed between the structural sleeve element and the column body, the contact element having the first contact body and the second contact body, the first contact body and the second contact body being rollable relative to the column body, the plate being arranged between the first contact body and the second contact body, and the plate being spaced apart from the first contact body in a first distance and being spaced apart from the second contact body in a second distance;

a slider being configured to the structural sleeve element;

an elastic element being connected to the column body and the structural sleeve element respectively, and permanently providing an elastic force; and a bearing board being disposed on the slider and bearing the display;

wherein a distance between the first contact body and the second contact body is substantially equal to a sum of the thickness, the first distance and the second distance, and when an external force is applied, the structural sleeve element makes the slider move between a highest position and a lowest position along the gravity direction, and when the external force is removed, the slider stops at any position between the highest position and the lowest position.

2. The supporting stand as claimed in claim 1, wherein the first side and the second side are opposite to each other, the first contact body abuts against the first side, and the second contact body abuts against the second side.

3. The supporting stand as claimed in claim 2, wherein the structural sleeve element has a first main board and a second main board, the first contact body is disposed on the first main board, the second contact body is disposed on the second main board, and the first contact body and the second contact body are located between the first main board and the second main board.

4. The supporting stand as claimed in claim 3, wherein the first sliding groove is formed on the first side, the second sliding groove is formed on the second side, the first contact body is accommodated in the first sliding groove, and the second contact body is accommodated in the second sliding groove.

5. The supporting stand as claimed in claim 4, wherein the first surface, the second surface, and the third surface of the first side are angularly connected to each other to define the first sliding groove, and the first contact body abuts against the first surface and the third surface of the first side, and wherein the first surface, the second surface, and the third surface of the second side are angularly and connected to each other to define the second sliding groove, and the second contact body abuts against the first surface and the third surface of the second side.

6. The supporting stand as claimed in claim 5, wherein the slider extends from the structural sleeve element along a first axis perpendicular to the gravity direction, the first main board has a first extending section for disposing the first contact body, the second main board has a second extending section for disposing the second contact body, and the first extending section and the second extending section are parallel to the first axis and spaced apart from each other.

7. The supporting stand as claimed in claim 6, wherein the first main board further has a first bending section angularly connected to the first extending section, the second main board further has a second bending section angularly connected to the second extending section, and the first bending section and the second bending section are perpendicular to the first axis and secured to each other.

8. The supporting stand as claimed in claim 7, wherein the elastic element has an elastic body and a base body, the base body is fixedly connected to the first extending section and the second extending section, and the elastic body is disposed in the base body and connected to an end of the column body.

9. The supporting stand as claimed in claim 1, wherein the first contact body is a wheel roller set, a ball roller set, a rolling column set, or a bearing set, and the second contact body is a wheel roller set, a ball roller set, a rolling column set, or a bearing set.

10. The supporting stand as claimed in claim 9, wherein a plurality of wheel rollers in the wheel roller set are arranged with misalignment, a plurality of ball rollers in the ball roller set are arranged with misalignment, a plurality of rolling columns in the rolling column set are arranged with misalignment, and a plurality of bearings in the bearing set are arranged with misalignment.

11. The supporting stand as claimed in claim 9, the structural sleeve element and the contact element surround the column body jointly.

12. The supporting stand as claimed in claim 11, wherein the contact element further has a third contact body and a fourth contact body, the column body further has a third side and a fourth side, the third contact body abuts against the third side, and the fourth contact body abuts against the fourth side.

13. The supporting stand as claimed in claim 12, wherein the third contact body and the fourth contact body are polyoxymethylene protruding blocks.

14. The supporting stand as claimed in claim 1, wherein the upright further comprises a housing for covering the column body and the slidable clipping unit.

15. The supporting stand as claimed in claim 14, further comprising a chassis, being arranged on the working plane, and the upright further comprising a transfer base that is detachably installed on the chassis for disposing the column body.

* * * * *